United States Patent [19]
Spink

[11] 3,966,458
[45] June 29, 1976

[54] SEPARATION OF ZIRCONIUM AND HAFNIUM

[75] Inventor: Donald R. Spink, Waterloo, Canada

[73] Assignee: Amax Speciality Metal Corporation, Greenwich, Conn.

[22] Filed: Sept. 6, 1974

[21] Appl. No.: 503,724

[52] U.S. Cl. ............................ 75/84.5; 75/84.4; 423/73; 423/75; 423/492
[51] Int. Cl.² .......................................... C22B 61/02
[58] Field of Search .................. 423/73, 75, 492; 75/84.5, 84.4

[56] References Cited
UNITED STATES PATENTS

| | | | |
|---|---|---|---|
| 2,744,060 | 5/1956 | Eaton | 423/73 |
| 2,791,485 | 5/1957 | Newnham | 423/73 |
| 2,961,293 | 11/1960 | Newnham | 423/73 |
| 3,671,186 | 6/1972 | Ishizuka | 423/73 |

FOREIGN PATENTS OR APPLICATIONS

| | | | |
|---|---|---|---|
| 790,345 | 4/1956 | United Kingdom | 423/73 |

*Primary Examiner*—Benjamin R. Padgett
*Assistant Examiner*—B. H. Hunt

[57] ABSTRACT

A process is provided for separating zirconium and hafnium tetrachlorides by the direct distillation from their solution in an eutectic mixture of sodium and potassium chlorides. Hafnium tetrachloride and zirconium tetrachloride are provided in adequate purity for direct introduction into reduction units for the production of the respective metals by virtue of controlled ratios of the salt eutectic solvent to the hafnium and zirconium tetrachlorides and by provision of a reflux of hafnium with added increments of the eutectic solvent salt mixture.

13 Claims, 1 Drawing Figure

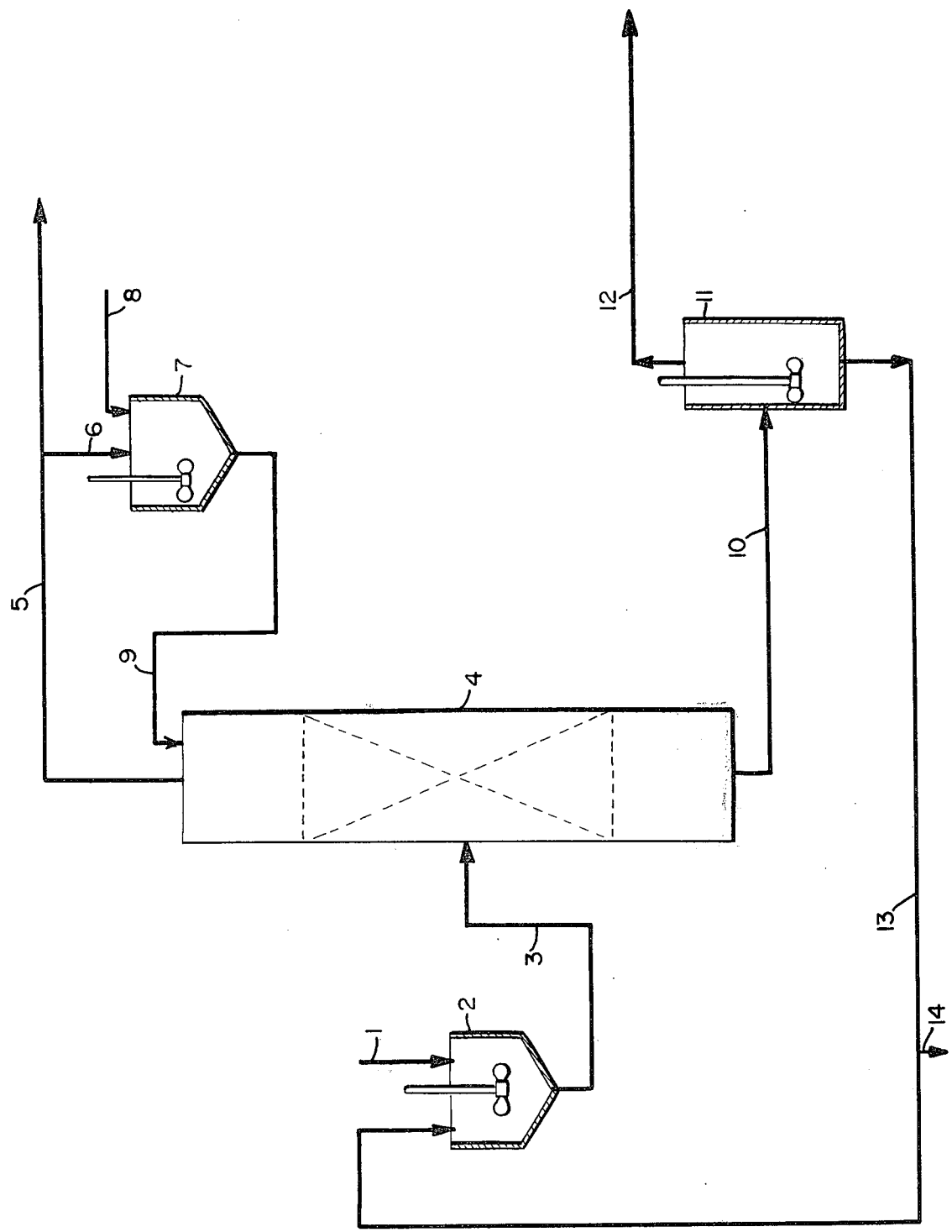

SEPARATION OF ZIRCONIUM AND HAFNIUM

BACKGROUND OF THE INVENTION

This invention relates to a continuous process for the separation of zirconium and hafnium tetrachlorides by distillation, wherein the tetrahalides are dissolved in a mixture of sodium and potassium chlorides to form a low-melting eutectic salt solution and the hafnium tetrachloride is removed as an overhead fraction from a thermal distillation column.

It further relates to the direct distillation of hafnium tetrachloride from a solution of hafnium and zirconium tetrachlorides in a sodium chloride-potassium chloride solvent, wherein the overhead hafnium tetrachloride vapor in a thermal distillation column is continuously washed with a reflux portion of the overhead hafnium tetrachloride in an eutectic solution of hafnium tetrachloride-sodium chloride-potassium chloride.

Still further this application relates to a process whereby the separated hafnium tetrachloride and zirconium tetrachloride are provided in the vapor phase, having sufficient purity for direct reduction to the respective metals.

In the production of zirconium and hafnium metals, the Kroll process has proved to be of great commercial interest. The Kroll process is chiefly concerned with the reduction of halides, e.g. the tetrahalides, of titanium, zirconium and hafnium with magnesium to provide the respective metals. The halides can be obtained from the metal ores by any of several well known methods, such as, for example, the formation of zirconium and hafnium carbide or carbo nitride in an arc furnace, and the subsequent chlorination thereof to mixed zirconium and hafnium tetrachlorides.

In another method, the ore is fused with a caustic soda flux and the resultant mass is water leached to separate the water soluble silicates from the water insoluble sodium zirconate and sodium hafnate. The alkali metal salts are converted to the oxides, which are directly chlorinated using carbon tetrachloride or mixtures of carbon and chlorine or to the carbide or carbo nitrides, which are then chlorinated.

While the direct reduction of the mixture of zirconium and hafnium tetrahalides is possible, and in some cases desirable for the production of alloys, such alloys find limited utility and it is more frequently desirable to produce the two metals separately in pure form. In the use of zirconium for nuclear reactors, virtually all of the hafnium must be removed due to its high thermal neutron capture cross section. Further, in the commercial production of zirconium and hafnium metals by the reduction of the respective tetrahalides, it is essential that the halides be free as possible from contamination by certain metals, such as iron and aluminum. It is also extremely important to remove gaseous impurities, such as oxygen and nitrogen present in any form, and to prevent further contact of the halide therewith, since oxygen and nitrogen will be carried into the finished metal causing it to be hard and brittle and thus difficult to work and not meeting established specifications.

The common commercial techniques for the separation of hafnium from zirconium are accomplished in extremely complex liquid-liquid extraction processes. In these processes the crude tetrachloride, consisting of chemically mixed zirconium tetrachloride and hafnium tetrachloride plus impurity chlorides, is dissolved in an aqueous solution containing a complexing agent. This aqueous solution is then contacted with a selective solvent, which serves to extract one of the elements. Both the extract and the raffinate are then treated to recover and recycle the chemicals used in the solution and in the liquid-liquid extraction, and the metal salts are then precipitated, filtered, washed, calcined, and rechlorinated. The equipment and processing entailed encompass a large portion of the entire processing facility for the production of zirconium and hafnium metals. The processes are complex, difficult to control, and utilize considerable amounts of relatively expensive and corrosive chemicals resulting in the use of expensive and short-lived equipment. In addition considerable amounts of labor are expended in the complex manipulation required. The separatory technique is a major contributor to the manufacturing cost of zirconium and hafnium metals. The separated tetrahalides of zirconium and hafnium must usually be treated subsequent to the separatory processing to remove the oxygen and nitrogen containing compounds, as well as iron and aluminum.

SUMMARY OF THE INVENTION

It is accordingly an object of the present invention to provide a continuous process for the separation of hafnium tetrachloride and zirconium tetrachloride, utilizing only one unit operation.

It is another object of this invention to provide a more efficient method for the separation of zirconium and hafnium tetrahalides.

A still further object of this invention is to provide a process for the separation of zirconium and hafnium tetrahalides which provide the separated zirconium tetrachloride and hafnium tetrachloride, in the vapor phase, with sufficient purity for direct and continuous introduction to a suitable reduction process for the continuous production of zirconium and hafnium metals.

These and other objects and advantages of this invention will become apparent from the following description and drawing.

In accordance with the present invention, it has been discovered that zirconium tetrahalide and hafnium tetrahalide, of high grade, are produced in an economical and efficient manner. Where the halide is chloride, this is accomplished by introducing a mixture of zirconium tetrachloride and hafnium tetrachloride substantially free of impurities into a solvent mixture comprising a molten solution of zirconium tetrachloride, sodium chloride, and potassium chloride. Upon complete dissolution of the mixed feed, the solution is then introduced into a thermal distillation column, wherein hafnium tetrachloride of sufficient purity for direct introduction into a reduction unit is provided as an overhead fraction. A bottom fraction, containing zirconium tetrachloride in a mixture with sodium and potassium chlorides, is withdrawn from the column and zirconium tetrachloride, in sufficient purity for direct introduction into a reduction unit, is obtained by vaporization from the eutectic salt mixture. While sodium and potassium are the preferred alkaline metals, other alkaline metal and alkaline earth halides also can be used.

The operation of the process of the present invention can be best understood with reference to the accompanying drawing, the single figure of which represents a flow chart of the process.

DETAILED DESCRIPTION OF AN ILLUSTRATED EMBODIMENT

With reference to the drawing, the process of the present invention is a recycling process conducted in the following manner. A feedstock of hafnium tetrachloride and zirconium tetrachloride of suitable purity, wherein the hafnium, calculated as metal, is present in an amount of from about 2 to 3 weight percent, based on the total zirconium plus hafnium present, is introduced via line 1 into mixing tank 2. The hafnium concentration in the feed, which corresponds to a hafnium tetrachloride concentration of about 1.41 to 2.17 weight percent, is that ordinarily occuring in the feed provided from naturally occurring ores. The form of the feedstock and the mode of instruction are a matter of convenience, and techniques well known in the art may be utilized. The feed can be intermittent. In mixing tank 2 the feed of zirconium tetrachloride containing hafnium tetrachloride is contacted with a molten mixture of zirconium chloride, potassium chloride, and sodium chloride, introduced into the tank via line 13. The hafnium content of this mixture with respect to zirconium will normally be less than 50 parts per million.

The preferred composition of the near-eutectic mixture formed in the mixing tank will be about 63 mole percent zirconium tetrachloride plus hafnium tetrachloride, about 29 mole percent potassium chloride and about 8 mole percent sodium chloride. Actually, a wide range of composition of the fused salt mixture can be used for the distillation step. For example, the fused salt solution can contain between 58 and 70 mole percent zirconium tetrachloride plus hafnium tetrachloride and still provide separation of hafnium tetrachloride from the zirconium tetrachloride. However, the range of about 63 to 65 mole percent zirconium tetrachloride is preferred. In addition, either sodium chloride or potassium chloride or both salts can be effectively used. The preferred composition of the eutectic mixture has been found to melt at the lowest temperature of any homogeneous melt for the system of zirconium tetrachloride-sodium chloride-potassium chloride which would indicate that this composition is the true eutectic composition for this system. The eutectic temperature is very close to 218°C. For the system of hafnium tetrachloride-sodium chloride-potassium chloride at the same composition, the eutectic temperature was found to be 234°C.

The materials combined in mixing tank 2 are held with agitation, at a temperature of about 290° to 350°C., preferably about 330° to 340°C. Dissolution of the mixed tetrachloride in the molten recycle stream is immediate so there is little need for a large hold-up at this point. The temperature of the recycle stream will be close to 400°C which means that it can be allowed to cool to attain the above preferred temperature range.

The solution provided in mixing tank 2 is passed through line 3 into thermal distillation column 4, which may be of any suitable type, such as a bubble cap type, or a packed or sieve plate type column. The tower is operated at about 1 atmosphere of pressure, and the temperature varies from about 325°C at the top up to about 400°C at the bottom, although higher temperature ranges can be used. While it is preferred that the distillation operation be conducted at atmospheric pressure, higher or lower pressures can be employed. The mixed salt solution feed, now containing less than 0.5 percent and preferably about 0.25 percent by weight hafnium based on the total amount of hafnium and zirconium, is pumped into the distillation tower at a level where the feed composition and temperature closely resemble the conditions within the tower.

If a bottom recycle stream is not employed, the feed containing 63 mole percent tetrachloride would now have two percent by weight of hafnium on a metal basis and 37 mole percent salts, the proportion of potassium chloride to sodium chloride being 29 to 8 molar. The operating conditions for the distillation column 4 are then: overhead temperature about 345°C; bottom temperature about at least 360°; feed location at approximately one third of the total number of plates in the column measured from the top; temperature difference from plate to plate of about 0.5°C; and operating pressure of 1 atmosphere. The bottom temperature depends upon the temperature difference from plate to plate which in turn depends upon whether it is based on theoretical or actual plates. The system requires about 50 theoretical plates and as many as 90 actual plates.

Under the equilibrium conditions thus established in the column, hafnium tetrachloride will be fractionally distilled from the eutectic solution, and removed as overhead via line 5, where a portion is diverted through line 6 into melting tank 7 while the remainder is removed from the system as relatively pure vapor product suited for direct introduction into a hafnium tetrachloride reduction process or the like. For example, the hafnium tetrachloride can be reacted with magnesium to provide pure hafnium metal.

The portion of hafnium tetrachloride diverted into melting tank 7 is there combined with an additional proper increment of pure and dry sodium and potassium chlorides introduced via line 8 to form an eutectic salt solution which is heated in the melting tank and held at a temperature of about 325°C. This eutectic solution is passed via reflux line 9 into the top of the column, where the additional increment of the molten salt serves as reflux to enhance the removal of zirconium tetrachloride vapors from the overhead. By virtue of the substantial reflux of hafnium tetrachloride in the eutectic molten salt solution, the hafnium tetrachloride overhead is maintained at a purity of 97 percent or greater with a maximum of 3 percent by weight of zirconium tetrachloride. For best results, the reflux salt solution will comprise a major portion of the hafnium tetrachloride overhead vapors, and contain about 65 mole percent hafnium tetrachloride, together with about 10 percent potassium chloride and about 4 percent sodium chloride by weight.

The fraction withdrawn as distillation tower bottoms, via line 10 at a temperature of about 400°C is an eutectic mixture of zirconium tetrachloride, potassium chloride and sodium chloride with a very minor residual amount of hafnium tetrachloride (about 0.005 weight percent with respect to the zirconium content or less). The eutectic is passed into vaporizer 11, where a portion of pure zirconium tetrachloride vapor is recovered as product. The vaporizer is maintained at about 380° to 480°C, preferably about 420° to 450°C., which serves to volatize a portion of the zirconium tetrachloride from the eutectic salt mix in a very pure form, having about 50 parts per million hafnium tetrachloride. The remainder of the solution is withdrawn from the bottom of the vaporizer via line 13, and has a composition of about 83 percent by weight zirconium tetrachloride, plus a few parts per million hafnium tetrachloride, and about 17 percent by weight of the specific sodium chloride-potassium chloride salt mix. A minor amount of the mixture can be withdrawn via line 14 to purge the system of the excess amount of salt, corresponding to the amount of salt added to the hafnium tetrachloride reflux in the distillation column. The purge salt, containing 83 percent zirconium tetrachloride, can be subjected to a high temperature vaporization to recover most of the zirconium tetrachloride or it can be fed directly as a molten salt to a reduction vessel where the salt tapped from the vessel would consist of a mixture of the reducing metal chloride, i.e. NaCl or $MgCl_2$, and potassium chloride and sodium chloride from the salt feed. The remainder of the molten salt mixture continues via line 13 to the feed dissolving tank 2, as recycle.

The viscosity of the eutectic and near eutectic fused salt solutions of zirconium tetrachloride/hafnium tetrachloride in the preferred potassium chloride-sodium chloride mix, or range of pure potassium chloride and/or sodium chloride mix, is relatively low in the temperature range recommended for the distillation operation. In particular, the viscosity was observed visually to be slightly less than the viscosity of water at room temperature. Upon measuring the relative volatilities of hafnium tetrachloride and zirconium tetrachloride over a fused salt solution, it was found that the vapor contained approximately 1.7 times as much hafnium tetrachloride as the solution. The foregoing make the separation of hafnium tetrachloride from zirconium tetrachloride by distillation of the salt solution a technically achievable process. It is of interest to note that the relative volatility of hafnium tetrachloride over zirconium tetrachloride is the same in the salt solution as between the pure components in the gaseous and liquid states.

The feed tetrahalides to the system must be of a reasonably pure quality such as may be obtained by fused-salt scrubbing or other methods well-known to those skilled in the art. The relatively more volatile halides such as $FeCl_3$, $TiCl_4$ and $AlCl_3$, if contained in the feed to any extent, may end up in one of the products. While the use of purge line 14 may well keep concentrations of these volatile chlorides below troublesome levels, the purer the feed tetrachloride to the system is, the easier is the operation.

According to a preferred mode of the present invention, the column bottoms stream, partially depleted of zirconium tetrachloride, is recycled along with the feed of $ZrCl_4$ and $HfCl_4$ back to the distillation column. Alternatively, the bottoms recycle could be eliminated in which case the bottoms salt would be subjected to a high temperature vaporization or fed directly to a reduction unit. Where no portion of the bottoms product is recycled to feed tank 2, the specified feed would be made from an appropriate mixture of crude $ZrCl_4$, NaCl and KCl in the preferred proportions, the $ZrCl_4$ containing the naturally occurring amount of $HfCl_4$. This approach would require large amounts of pure NaCl and KCl which would eventually require disposal.

According to another viable alternative, a portion of the pure zirconium tetrachloride vapor from the reboiler or vaporizer 11 could be recycled to the bottom of column 4 so as to improve the separation efficiency in the lower portions of the column.

By the method of the present invention the highly complex and expensive operations required in the liquid-liquid extraction technique are avoided. Furthermore, by the method of this invention, exposure of the purified zirconium and hafnium tetrachlorides to contamination by oxygen, nitrogen, moisture and the like prior to and during the purification operation is eliminated. The products of the present invention are suitable for direct introduction into a reduction process, whereby the desired hafnium and zirconium metals are produced, without condensation or further handling that would expose the pure materials to potential contamination.

It is to be understood that the foregoing description is an illustrative embodiment of the present invention. The proportions and operating conditions of this system may be varied broadly to achieve the desired results, and it is intended that the present invention not be limited by such defined conditions of the foregoing description, but rather that the invention be limited only by the following appended claims.

I claim:

1. A continuous process for the separation of the tetrahalides of hafnium and zirconium comprising dissolving a crude feed consisting essentially of hafnium tetrahalide and zirconium tetrahalide in a solvent comprising a near eutectic mixture of zirconium tetrahalide and at least one alkaline metal halide selected from the group consisting of sodium, potassium and lithium to form a first solution, introducing said first solution of an elevated temperature into a distillation tower, withdrawing hafnium tetrahalide vapor from the said solution as the overhead product, adding at least one alkaline metal halide selected from the group consisting of sodium, lithium and potassium to a portion of said hafnium tetrahalide vapor at an elevated temperature to form an eutectic second solution, introducing said second solution into the distillation tower as a reflux, withdrawing an eutectic third solution of zirconium tetrahalide and at least one alkaline metal halide selected from the group consisting of sodium, potassium and lithium as a bottoms fraction from said distillation tower, and separating from said third solution a portion of zirconium tetrahalide.

2. The process of claim 1 wherein said halide is chloride.

3. The process of claim 2 wherein said alkaline metal halide consists of a mixture of sodium chloride and potassium chloride.

4. The process of claim 1, wherein zirconium tetrahalide is separated from the eutectic third solution by vaporization.

5. The process of claim 1, wherein a fraction of the remainder of said third solution after said separation of a portion of zirconium tetrahalide therefrom is reduced to produce zirconium metal.

6. The process of claim 4 further including recycling substantially the remainder of said third solution, after separation of zirconium tetrahalide therefrom, as solvent to dissolve said crude zirconium tetrahalide feed, the said remainder containing zirconium tetrahalide.

7. The process of claim 4 further including recycling a portion of pure zirconium tetrahalide vapor to the bottom of said distillation tower to improve the separation efficiency in the lower portions of the tower.

8. The process of claim 6, wherein said halides are chlorides.

9. The process of claim 8, wherein said alkaline salt consists of sodium chloride and potassium chloride.

10. A continuous process for the separation of the tetrahalides of hafnium and zirconium and for the production of pure zirconium metal comprising mixing crude zirconium tetrachloride containing hafnium tetrachloride with sodium chloride and potassium chloride to form an eutectic salt containing about 65 mole percent zirconium tetrachloride and hafnium tetrachloride, about 29 mole percent potassium chloride and about 8 mole percent sodium chloride, melting the mixture at a temperature less than about 220°C to form a molten salt mixture, feeding the molten salt mixture to a distillation tower and withdrawing pure hafnium tetrachloride vapor as an overhead product, removing a bottoms product from said tower comprising a molten hafnium-free salt containing about 85 percent by weight zirconium tetrachloride, heating said bottoms product to remove a portion of the pure zirconium tetrachloride, reducing said pure zirconium tetrachloride with magnesium to provide pure zirconium metal, recycling the remainder of the bottoms product to said eutectic salt and combining a portion of the hafnium tetrachloride overhead product with a mixture of sodium chloride and potassium chloride to form an eutectic reflux which is introduced to said column.

11. A process according to claim 1, further including reducing the hafnium tetrachloride product with magnesium to provide pure hafnium metal.

12. The process of claim 2, wherein the separated tetrachloride streams are respectively reduced with magnesium to provide pure metals.

13. The process of claim 1 wherein the temperature of the distillation column is maintained at about 325°C at the upper portion of the column and about 400°C at the lower portion of the column, and the pressure is maintained at about one atmosphere.

* * * * *

UNITED STATES PATENT AND TRADEMARK OFFICE
CERTIFICATE OF CORRECTION

PATENT NO. : 3,966,458
DATED : June 29, 1976
INVENTOR(S) : Donald R. Spink

It is certified that error appears in the above-identified patent and that said Letters Patent are hereby corrected as shown below:

Assignee: "Amax Speciality Metal Corporation" should read --Amax Specialty Metals Corporation--

Signed and Sealed this

Twelfth Day of October 1976

[SEAL]

Attest:

RUTH C. MASON
Attesting Officer

C. MARSHALL DANN
Commissioner of Patents and Trademarks